United States Patent [19]

Gendler et al.

[11] 4,309,255

[45] Jan. 5, 1982

[54] ELECTROCHROMIC RECORDING PAPER

[75] Inventors: Paul L. Gendler; Barbara D. Grant, both of San Jose; Clinton D. Snyder, Los Gatos, all of Calif.

[73] Assignee: International Business Machines Corporation, Armonk, N.Y.

[21] Appl. No.: 185,813

[22] Filed: Sep. 10, 1980

[51] Int. Cl.[3] .......... G01D 15/06

[52] U.S. Cl. .......... 204/2

[58] Field of Search .......... 204/2; 427/151; 346/135.1

[56] References Cited

U.S. PATENT DOCUMENTS

| | | | |
|---|---|---|---|
| Re. 29,427 | 10/1977 | Sekine | 204/2 |
| 3,864,684 | 2/1975 | Shimuzu | 204/2 |
| 3,871,972 | 3/1975 | Sekine | 204/2 |
| 3,951,757 | 4/1976 | Yoshino | 204/2 |
| 4,211,616 | 7/1980 | Sambucetti | 204/2 |

*Primary Examiner*—T. M. Tufariello
*Attorney, Agent, or Firm*—Joseph G. Walsh

[57] ABSTRACT

A medium for electrochromic recording is provided by treating paper with a water soluble leuco methylene blue compound having the formula wherein R is a sulfonated aromatic or sulfonated aliphatic moiety.

3 Claims, No Drawings

ELECTROCHROMIC RECORDING PAPER

DESCRIPTION

Technical Field

The present invention is concerned with paper for use in electrochromic recording. In particular, it is concerned with paper which contains a water soluble leuco methylene blue compound having the formula

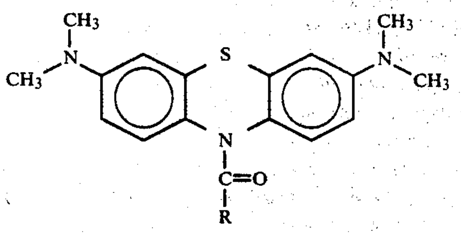

wherein R is a sulfonated aromatic or sulfonated aliphatic moiety.

Background Art

Various forms of electrical printing have been known for some time. The production of visible images by the application of electricity to sensitive material is shown, for example, in U.S. Pat. No. 3,726,769, which also contains a description of the prior art. The patent, however, uses only materials not at all related to the materials of the present invention.

U.S. Pat. Nos. RE. 29,427; 3,864,684; 3,871,972; 3,951,757 and 4,133,933 all disclose the use of leuco methylene blue in electrothermic recording systems. These patents, however, do not show any water soluble leuco methylene blue compounds. Specifically, they do not show the sulfonated materials employed in the present invention.

DISCLOSURE OF THE INVENTION

According to the present invention, paper is treated with an ink formulation containing a water soluble leuco methylene blue material having the structure given above. This treatment of the paper should involve at least a coating on one surface. When so desired, the paper may be coated on both surfaces or even totally impregnated with the leuco methylene blue material.

By any of the methods known to the prior art, electrical current may be selectively applied to the desired portions of the treated paper. The application of electrical current causes an electrochromic reaction; that is, visible colors are produced and an image may thereby be formed.

Because the compounds used in the present invention are water soluble, the treatment of the paper can be effected using aqueous coatings. The use of an aqueous solution rather than an organic solvent is a considerable advantage since the use of an organic solvent not only presents environmental problems, but is incompatible with conventional commercial coating paper techniques and can have a detrimental effect on paper quality and appearance.

It is an additional advantage of the present invention that image formation is observed at an applied voltage as low as 2 volts with satisfactory printing speed. This low voltage is considerably lower than that which has been observed to be required for non-water soluble materials.

It is still an additional advantage of the present invention that a large percentage of the leuco dye is converted to the dye by the application of a given pulse of electrical energy. In view of this, the amount of leuco dye which needs to be applied to the paper is decreased. Furthermore the printing resulting from the present invention is free from streaking in the optimum cases.

In summary, by the use of the materials of the present invention, a leuco dye is readily applied to paper by a simple process. The resulting treated paper yields rapid conversion to print when addressed by a positive voltage electrode near the moistened paper surface. The print is of high contrast.

As stated previously, according to the present invention, paper is treated with a water soluble leuco methylene blue material having the formula

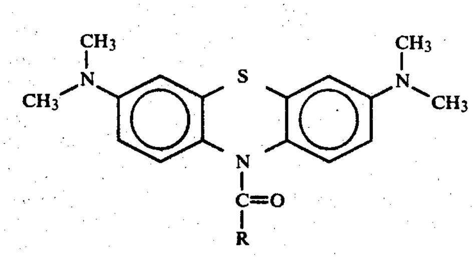

wherein R is a sulfonated aromatic or sulfonated aliphatic moiety. It is to be understood that the term sulfonated is intended to include polysulfonated materials. In like manner the term aromatic is intended to include not only phenyl structures but biphenyl structures, condensed aromatic structures, and hetero aromatic structures. The water soluble form of the compound can be in the form of either the free sulfonic acid or in most cases in the form of salts, particularly sodium salts, potassium salts, or ammonium salts. The most preferred compounds are the water soluble salts of 3,7-bis-(dimethylamino)-10-(2-sulfobenzoyl)-phenothiazine, particularly the potassium salt.

The amount of leuco dye to be applied to the paper may vary considerably depending upon the particular end use. In general, however, it is preferred that the typical loading for a standard $8\frac{1}{2}\times 11''$ page of paper of ordinary thickness be on the order of approximately 10 mg.

The compounds useful in the present invention may readily be prepared from commercially available materials by well known chemical reactions. The following synthetic procedure is given as a preferred method of synthesizing one of the preferred materials for use in the present invention. Other materials may be made by corresponding reactions, varying the starting materials.

Prep. Of N-(O-Sulfobenzoyl) Leucomethylene Blue Potassium Salt

In a 2 l. 3 neck round bottom flask with bottom drain equipped with mechanical stirrer, Dean-Stark trap, condenser, internal thermometer, heating mantle and nitrogen inlet was placed 2-picoline (300 cc), toluene (600 cc) and methylenebluechloride trihydrate (74.8 G., 0.20 mol, Aldrich) dissolved in warm water (1.0 l.). The resulting two phase system was stirred under nitrogen at 40° and sodium dithionite (65 g., 0.37 mol) was added all at once and stirring continued until the blue color was completely discharged. At this point the stirring was stopped and the aqueous phase was allowed to separate and was drawn off. After the initial phase separation more 2-picoline (300 cc), sodium dithionite (5.0 g., 0.03 mol) and saturated NaCl solution (250 cc) was added, the solution was stirred a couple of minutes and then the phases were allowed to separate and the bottom aqueous layer drawn off. The resulting solution was gradually brought to a boil and water (~50 cc, amount varies as efficiency of phase separations) and organic material (mostly toluene, 600 cc) was distilled out. The remaining picoline solution of leuco methylene blue was cooled to 70° and sulfobenzoic anhydride (SBA) (54.2 g., 0.30 mol, 1.5 eq) was added in portions (exothermic reaction) with vigorous stirring. After all the SBA had been added the solution was brought back to reflux (TLC at this time should show no more leuco methylene blue, if it is still present more SBA must be added) and the bulk of the remaining picoline (~600 cc) was distilled out at atmospheric pressure and any residual solvent removed under vacuum. Ethanol (250 cc) was added to the dark viscous residue, the resulting solution was boiled and stirred a few minutes and then water (280 cc) was added dropwise over ~5 minutes with stirring to precipitate the product. The slurry was cooled to room temperature, filtered through a medium frit sintered glass funnel and the solid product washed with 1:1 EtOH/$H_2O$ (250 cc). After drying in a vacuum oven (50°) to constant weight, the product picoline salt weighed 85.0 g. 75%. The residue in the reactor flask and drain plug was dissolved in boiling ethanol (200 cc) which was boiled down (to 100 cc) and diluted with $H_2O$ (100 cc) to give more product which was filtered, washed and dried similar to the bulk product; 6.3 g., 5%.

Total yield: 91.3 g., 80%. The bulk product analyzes for the 1½ hydrate: Calc. for $C_{29}H_{33}N_4O_{5.5}S_2$ C, 59.06; H, 5.64; N 9.50. Found C, 58.75; H, 5.23; N, 9.35. NMR ($CDCl_3$): 8.95 D(J=6) 1H; 8.05 M, 2H; 7.6–6.5 M 10H total; 6.18 $D_1D$(J=3,8) 1H; 5.37 S(broad) 3H; 2.91 S 6H; 2.79 S 9H; M/e (% base peak): 285, 270, 269, 254, 242, 241, 225, 184, 141, 135, 120, 104, 93.

The picoline salt is dissolved in warm ethanol and treated with an ethanolic solution of KOH, thereby producing the potassium salt.

We claim:

1. A substrate for use in electrochromic recording comprising paper containing a water soluble leuco methylene blue compound which is a salt of 3,7-bis-(dimethylamino)-10-(2-sulfobenzoyl)-phenothiazine.

2. A substrate as claimed in claim 1 wherein the paper contains approximately 10 mg of leuco methylene blue material per standard page.

3. A substrate as claimed in claim 1 wherein the water soluble leuco methylene blue compound is the potassium salt of 3,7-bis-(dimethylamino)-10-(2-sulfobenzoyl)-phenothiazine.

* * * * *